United States Patent
Kukino (10) Patent No.: US 9,094,542 B2
(45) Date of Patent: Jul. 28, 2015

(54) PRINTING CONTROLLER, PRINTING CONTROL METHOD, AND PRINTING CONTROL PROGRAM

(75) Inventor: Hirofumi Kukino, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 13/410,508

(22) Filed: Mar. 2, 2012

(65) Prior Publication Data

US 2012/0224228 A1    Sep. 6, 2012

(30) Foreign Application Priority Data

Mar. 2, 2011    (JP) ................. 2011-044791

(51) Int. Cl.
*G06K 15/00* (2006.01)
*H04N 1/405* (2006.01)
*H04N 1/00* (2006.01)
*G06F 3/12* (2006.01)

(52) U.S. Cl.
CPC .......... *H04N 1/00172* (2013.01); *G06F 3/1208* (2013.01); *G06F 3/1262* (2013.01); *G06F 3/1264* (2013.01); *G06F 3/1284* (2013.01); *H04N 1/00137* (2013.01); *H04N 1/00145* (2013.01); *H04N 1/00188* (2013.01)

(58) Field of Classification Search
USPC ..................................... 358/3.06, 1.9; 400/76
See application file for complete search history.

(56) References Cited

U.S. PATENT DOCUMENTS

| | | | |
|---|---|---|---|
| 6,469,770 B2 | 10/2002 | Hoshino et al. | |
| 6,774,980 B2 | 8/2004 | Hoshino et al. | |
| 2002/0021902 A1 | 2/2002 | Hosoda et al. | |
| 2005/0190400 A1* | 9/2005 | Redd et al. | 358/1.15 |
| 2006/0139474 A1* | 6/2006 | Endsley et al. | 348/333.11 |
| 2008/0145125 A1* | 6/2008 | Mestha et al. | 400/76 |
| 2008/0240829 A1* | 10/2008 | Miyazaki et al. | 400/76 |

FOREIGN PATENT DOCUMENTS

| | | |
|---|---|---|
| JP | 11-327745 A | 11/1999 |
| JP | 2002-036682 A | 2/2002 |
| JP | 2005-258312 A | 9/2005 |
| JP | 2005-319672 A | 11/2005 |

* cited by examiner

*Primary Examiner* — Vincent Rudolph
*Assistant Examiner* — Michael Burleson
(74) *Attorney, Agent, or Firm* — Nutter McClennen & Fish LLP; John J. Penny, Jr.

(57) ABSTRACT

A printing controller includes a reprint information acquisition section that acquires reprint information as information relating to a second image to be reprinted out of a plurality of first images having been printed on a printing medium, and an output section that prints the second image. The reprint information includes printing order information indicating a printing order position at which the first image corresponding to the second image was printed. When a plurality of second images are to be reprinted, the output section prints the second images on the basis of the printing order information.

5 Claims, 8 Drawing Sheets

PRINTING CONTROLLER, PRINTING CONTROL METHOD, AND PRINTING CONTROL PROGRAM

BACKGROUND

1. Technical Field

The present invention relates to a printing controller, a printing control method, and a printing control program.

2. Related Art

Images taken by a digital camera, for example, have been generally printed by using an ink jet printer. Some images among the printed images are reprinted as reprints. For example, in a print service including a reprint service disclosed in JP-A-2002-36682, information such as the number of prints and a paper discharging method is added to electronic information exchanged between a printer and an external apparatus such as a personal computer, a mobile terminal, or a digital camera, so that the use of the information enables sorting of prints and various sorting operations in a print service operation to be automated and streamlined.

In the reprint service disclosed in JP-A-2002-36682, the prints of the reprint images can be discharged through an appropriate discharging port, but the printing order of the prints is not taken into consideration. Accordingly, it is not easy to organize the reprinted prints if the printing order of the reprinted prints is not clear when the prints of various types of images are reprinted in various ways. In addition, it may take time to confirm whether all of the designated prints to be reprinted have been reprinted satisfactorily.

SUMMARY

The invention can be achieved by adopting the following aspects or application examples.

Application Example 1

A printing controller according to a first aspect of the invention includes a reprint information acquisition section that acquires reprint information relating to a second image to be reprinted out of a plurality of first images having been printed on a printing medium, and an output section that prints the second image. The reprint information includes printing order information indicating a printing order position at which the first image corresponding to the second image was printed in a printing order. When a plurality of second images are to be reprinted, the output section prints the second images on the basis of the printing order information.

In the printing controller, the output section prints the second images to be reprinted on the basis of the printing order in which the first images, which are the original images of the reprints, were printed. Accordingly, the second images to be reprinted can be printed in accordance with the printing order in which the first images, which are the original images of the reprints, were printed. As a result, the printing order of the second images to be reprinted is made clear, allowing the prints of the second images to be easily organized and the confirmation of whether all of the prints of the second images have been satisfactorily printed to be also easily made.

Application Example 2

In the printing controller, the reprint information may include color correction information when the first image has been printed and the second image is to be corrected on the basis of the color correction information.

The printing controller can print the second image in the same color as the print of the first image by correcting the second image to be reprinted on the basis of the color correction information when the first image has been printed.

Application Example 3

The printing controller may further include a halftone processing section that performs halftone processing on an image. The halftone processing section may perform halftone processing on the second images sorted on the basis of the printing order information.

With the printing controller, it can be expected that the images of the second images sorted on the basis of the printing order information and subjected to the halftone processing will not be perceived as being different from the images of the first images after being subjected to the halftone processing.

Application Example 4

A printing control method according to a second aspect of the invention includes acquiring reprint information relating to a second image to be reprinted out of a plurality of first images having been printed on a printing medium, and printing the second image. The reprint information includes printing order information indicating a printing order position at which the first image corresponding to the second image was printed in a printing order. When a plurality of second images are to be reprinted, the second images are printed in the printing operation on the basis of the printing order information.

In the printing control method, the second images to be reprinted are printed in the printing operation on the basis of the printing order in which the first images, which are the original images of the reprints, were printed. Accordingly, the second images to be reprinted can be printed in accordance with the printing order in which the first images, which are the original images of the reprints, were printed. As a result, the printing order of the second images to be reprinted is made clear, allowing the prints of the second images to be easily organized and the confirmation of whether all of the prints of the second images have been satisfactorily printed to be also easily made.

Application Example 5

A printing control program according to a third aspect of the invention causes a computer to perform a reprint information acquisition function to acquire reprint information relating to a second image to be reprinted out of a plurality of first images having been printed on a printing medium, and an output function to print the second image. The reprint information includes printing order information indicating a printing order position at which the first image corresponding to the second image was printed in a printing order. When a plurality of second images are to be reprinted, the program causes a computer to print the second images on the basis of the printing order information.

In the printing control program, the second images to be reprinted are printed by the output function on the basis of the printing order in which the first images, which are the original images of the reprints, were printed. Accordingly, the second images to be reprinted can be printed in accordance with the printing order in which the first images, which are the original images of the reprints, were printed. As a result, the printing order of the second images to be reprinted is made clear, allowing the prints of the second images to be easily organized and the confirmation of whether all of the prints of the second images have been satisfactorily printed to be also easily made.

BRIEF DESCRIPTION OF THE DRAWINGS

The invention will be described with reference to the accompanying drawings, wherein like numbers reference like elements.

FIGS. 5A and 5B are explanatory views illustrating examples of images printed on roll paper.

DESCRIPTION OF EXEMPLARY EMBODIMENT

A printing controller according to an embodiment is described below with reference to the accompanying drawings.

System Structure

Figure 1:
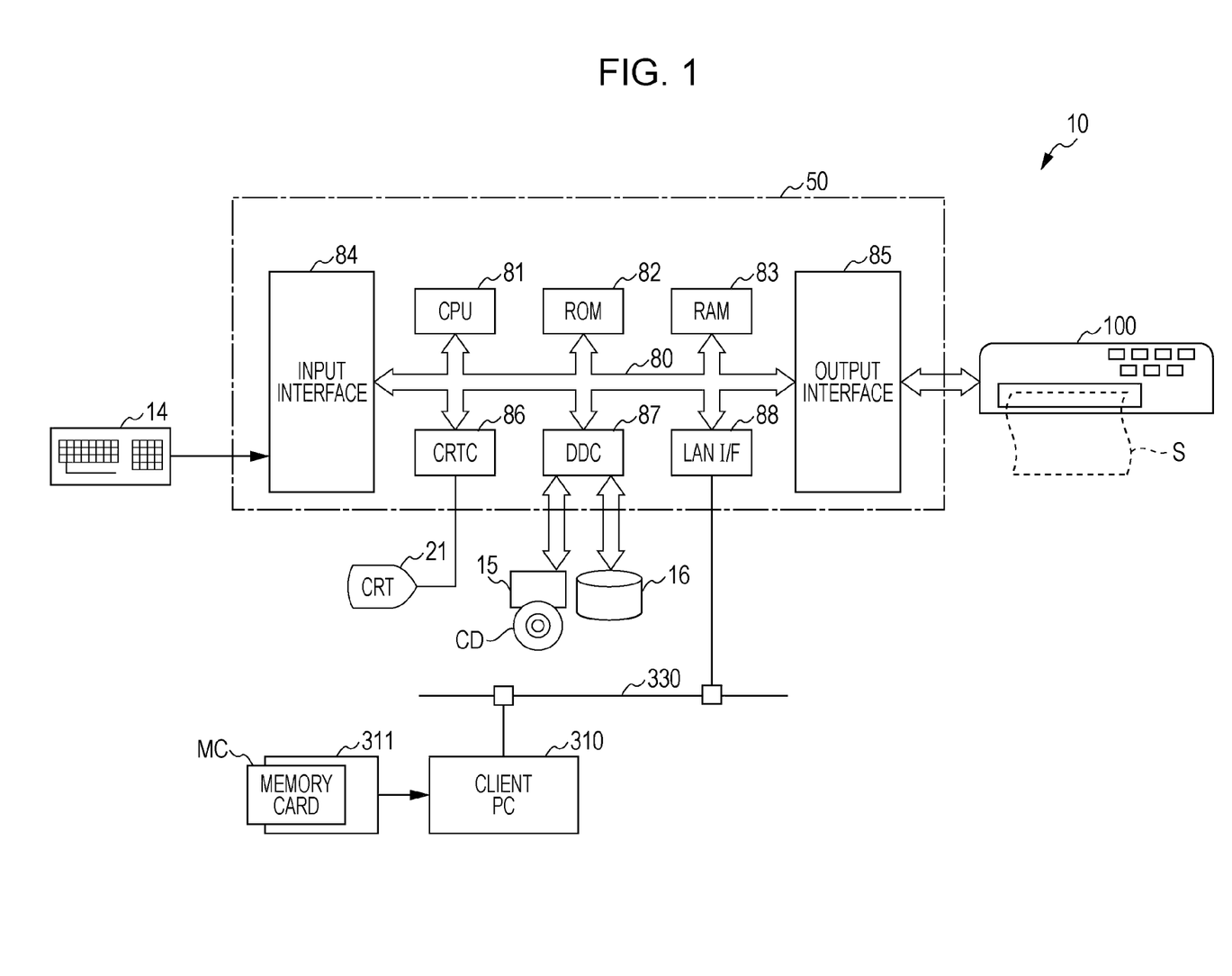
FIG. 1 is a block diagram illustrating a structure of a printing system including a printing controller according to an embodiment.

A structure of a printing system including the printing controller according to the embodiment is described below. FIG. 1 is a block diagram illustrating the structure of the printing system including the printing controller according to the embodiment. As illustrated in FIG. 1, a printing system 10 includes a client personal computer 310 (hereinafter abbreviated as a "client PC"), a computer 50 for performing printing, a local area network 330 (hereinafter abbreviated as a "LAN") that connects the client personal computer 310 and the computer 50, and a color printer 100 (hereinafter abbreviated as a "printer") connected to the computer 50.

The client PC 310 is a terminal device, which is installed in a shop called a "print lab station", for example. A user who wants to print images operates the terminal device so as to make a request for image printing therethrough. A memory card slot 311 that reads image data stored in a memory card MC is connected to the client PC 310. A user inserts the memory card MC into the memory card slot 311 and operates the client PC 310. The client PC 310 may be a general personal computer or a dedicated terminal device allowing photo images, for example, to be easily input thereinto. The image data is not limited to being stored in and read from the memory card MC. For example, the image data may be stored in and read from a compact disk-recordable (CD-R) or a digital camera.

A request for image printing made through the client PC 310 is transmitted to the computer 50 through the LAN 330. The number of client PCs 310 is not limited to one. A plurality of client PCs 310 may be included in the system. The LAN 330 may be a wired network or a wireless network.

The computer 50 loads a predetermined program, executes the program, and functions as a printing controller that controls the printer 100. The computer 50 includes a CPU 81 that executes various arithmetic processing operations in accordance with the program, a ROM 82, and a RAM 83 that are connected to each other through a bus 80 as major components. The computer 50 also includes the following components coupled to each other through the bus 80. An input interface 84 processes a signal input from a keyboard 14, for example. An output interface 85 processes data to be output to the printer 100. A CRT 86 controls output of a signal to a CRT 21 capable of displaying color images. A disk controller (DDC) 87 controls exchange of data between the computer 50 and a hard disk 16, a CD-ROM drive 15, and a flexible disk drive (not illustrated). The hard disk 16 stores various programs that are loaded into the RAM 83 and executed and various programs provided as device drivers, for example.

In addition, a LAN interface (LAN I/F) 88 is connected to the bus 80. The LAN I/F 88 is an interface for connecting the computer 50 and the LAN 330.

The printer 100 is a dedicated ink jet printer using roll paper S as a printing medium and can produce prints on both front and back surfaces of the roll paper S. The printer 100 prints images on the front surface of the roll paper S by reciprocating a front surface printing head (not illustrated) having a plurality of nozzles to eject ink in a direction perpendicular to a longitudinal direction (transportation direction) of the roll paper S as a main-scanning operation, and by moving the front surface printing head and the roll paper S relatively in the longitudinal direction as a sub-scanning operation. The computer 50 outputs, for example, raster data to the printer 100 as printing data. The raster data specifies nozzles each forming a dot on a specific pixel in the main-scanning operation. The printer 100 executes the main-scanning operation and the sub-scanning operation on the basis of the printing data and sequentially prints photo images, for example, on the front surface of the roll paper S in the longitudinal direction.

In addition, the printer 100 includes a back surface printing head (not illustrated) that prints characters and the like on the back surface of the roll paper S by performing dot impact printing and prints images on the back surface of the roll paper S by performing the main-scanning operation and the sub-scanning operation in the same manner as the front surface printing head. The computer 50 also outputs printing data to produce prints on the back surface of the roll paper S to the printer 100. Furthermore, the printer 100 includes a cutter (not illustrated), enabling photo images, for example, printed on the roll paper S to be cut individually.

Software Configuration

Figure 2:
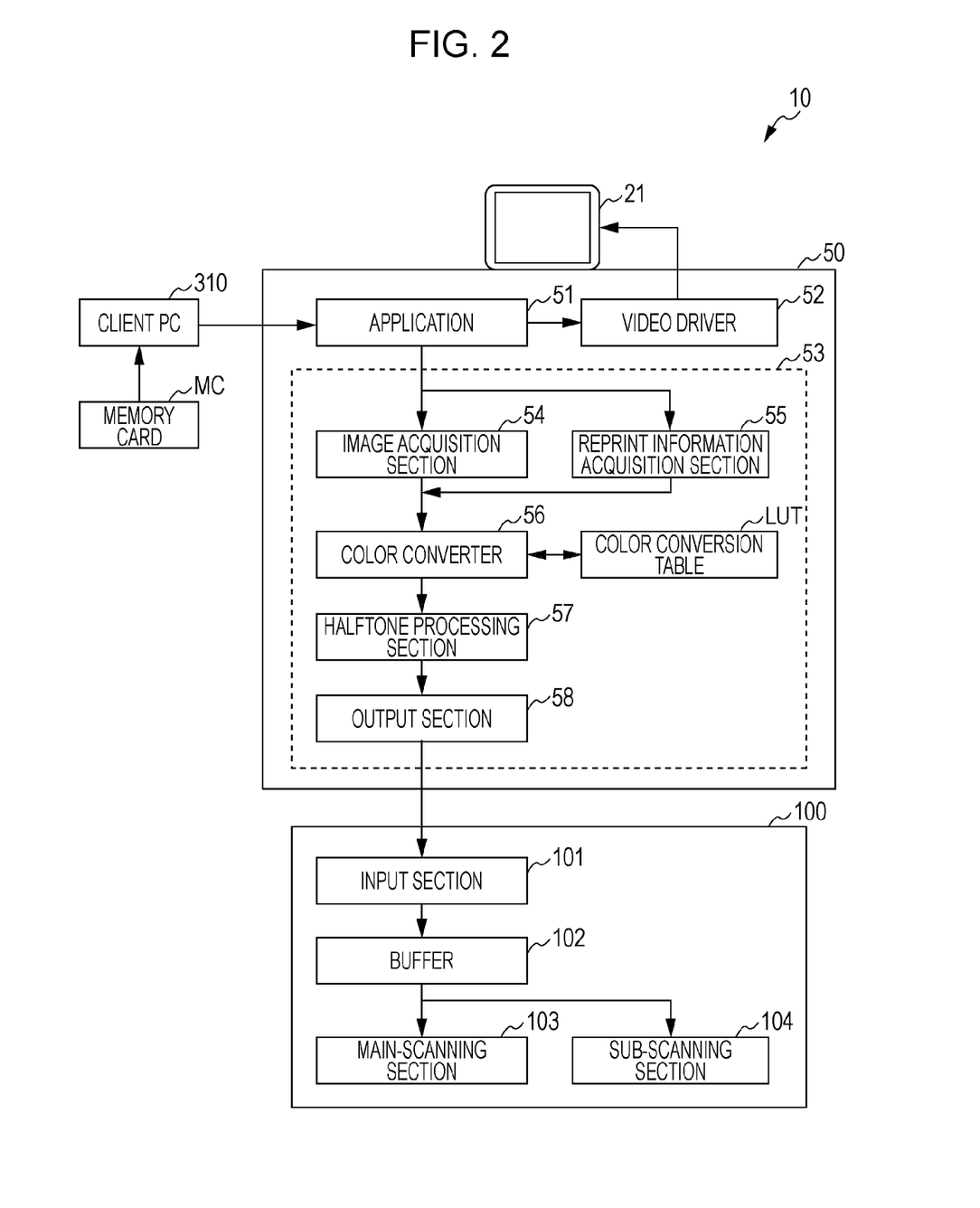
FIG. 2 is a block diagram illustrating a software configuration of the printing system.

A software configuration of the printing system 10 is described below. FIG. 2 is a block diagram illustrating the software configuration of the printing system 10. In the computer 50, an application program 51 operates under a predetermined operating system. The application program 51 receives printing request data for image printing transmitted from the client PC 310. The client PC 310 makes a printing request for an image selected by a user as a printing target out of images stored in the memory card MC. In the making of the request, the client PC 310 displays the images stored in the memory card MC as a list of thumbnail images for the user, for example.

Figure 3:
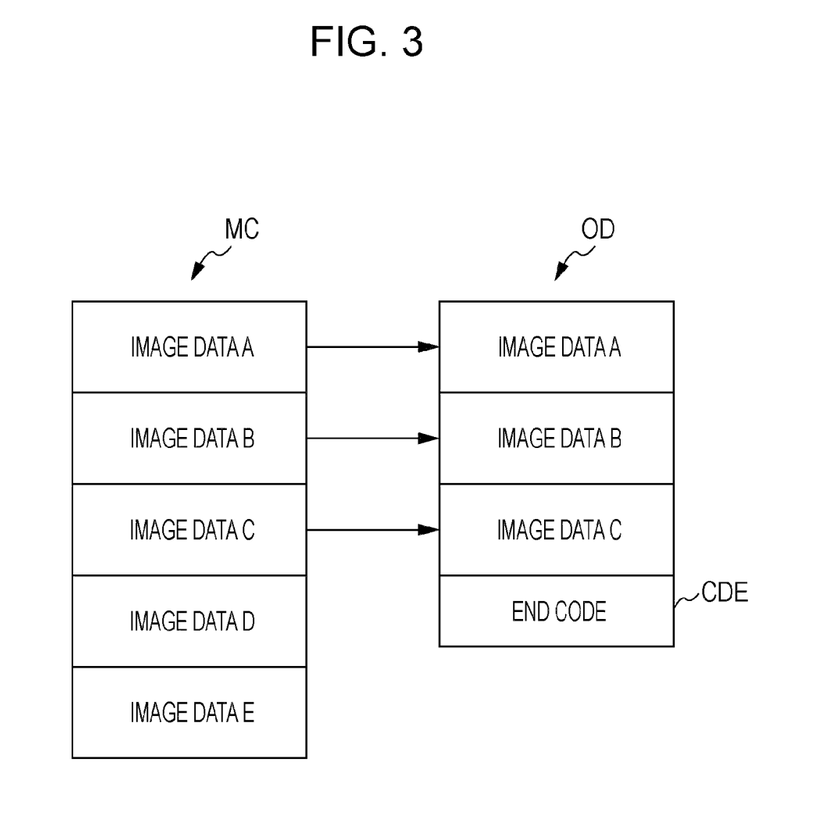
FIG. 3 is an explanatory view illustrating an example of image data stored in a memory card and printing request data transmitted from a client PC.

FIG. 3 is an explanatory view illustrating an example of image data stored in the memory card MC and printing request data OD transmitted from the client PC 310. As illustrated in FIG. 3, image data A to E are stored in the memory card MC. A user selects image data A to C out of the image data A to E and makes a printing request. The client PC 310 transmits the printing request data OD including the image data A, the image data B, and the image data C in this order to the computer 50. The printing request data OD includes at the end thereof an end code CDE indicating the end of the data.

Referring back to FIG. 2, a video driver 52 and a printer driver 53 are built into the operating system of the computer 50. The application program 51 causes the CRT display 21 to display thumbnail images of image data included in the printing request data OD received from the client PC 310 through the video driver 52. The application program 51 produces image data to be output to the printer 100 through the printer driver 53 and outputs the produced image data. The image data produced by the application program 51 is composed of data having three color components of red (R), green (G), and blue (B).

The printer driver 53 includes an image acquisition section 54, a reprint information acquisition section 55, a color converter 56, a halftone processing section 57, and an output section 58. Upon transmission of a printing command from the application program 51, the image acquisition section 54 receives image data output from the application program 51. The color converter 56 corrects the color components of R, G, and B of the received image data to color components (herein cyan, magenta, yellow, and black) that the printer 100 can print.

The halftone processing section 57 sets a dot of each pixel to on or off so as to be able to print a tone value of the corrected image data by using a halftone technique such as a dither method or an error diffusion method.

The output section 58 sets a sub-scanning amount in printing. When an image is printed on the front surface of the roll paper S, a position of each nozzle of the printer 100 is determined on the basis of the sub-scanning amount, and a raster to be printed is selected. Then, pieces of printing data of the rasters are sorted in the order in which output is to be performed from the front surface printing head so as to in line with the main-scanning direction of the front surface printing head of the printer 100. The printer driver 53 outputs the image data thus processed, for example, to the printer 100 as printing data. The processing from the receipt of image data to the output of printing data to the printer 100 is performed for each piece of image data received from the application program 51.

The printer 100 includes an input section 101, a buffer 102, a main-scanning section 103, and a sub-scanning section 104. The input section 101 receives printing data output from the computer 50. The received printing data is temporarily stored in the buffer 102. Data stored in the buffer 102 is output to the main-scanning section 103 and the sub-scanning section 104.

The main-scanning section 103 moves the front surface printing head so as to perform the main-scanning operation and produces a print on the basis of printing data for front surface printing when a print is to be produced on the front surface of the roll paper S. The main-scanning section 103 moves the back surface printing head so as to perform the main-scanning operation and produces a print on the basis of printing data for back surface printing when a print is to be produced on the back surface of the roll paper S. Meanwhile, the sub-scanning section 104 transports the roll paper S on the basis of data of the sub-scanning amount included in the printing data. The roll paper S is automatically cut at a border of a printed image by an auto cutter (not illustrated) after being transferred.

Printing Data Creation Processing

Printing data creation processing in the computer 50 is described below.

Figure 4:
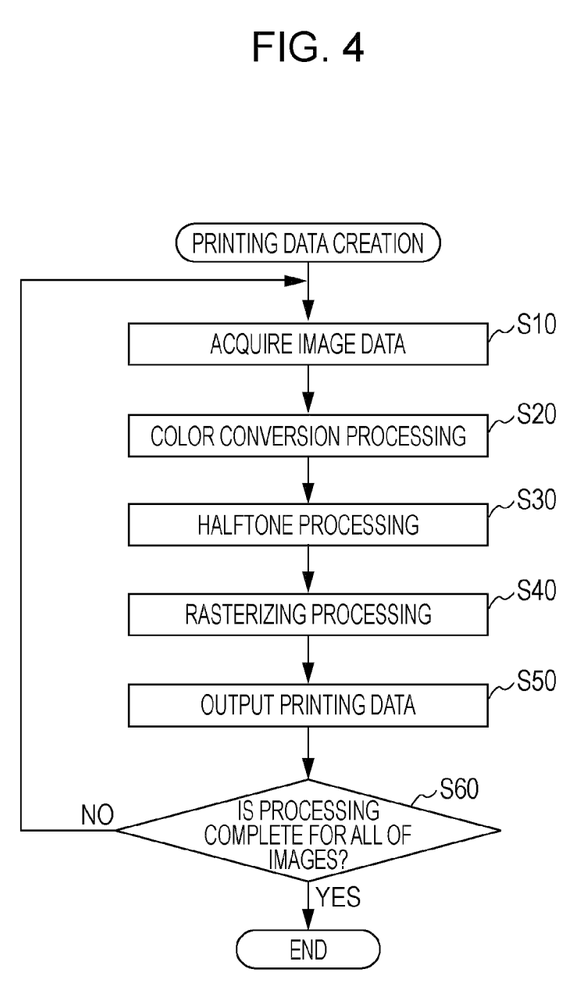
FIG. 4 is a flowchart illustrating printing data creation processing.

FIG. 4 is a flowchart illustrating the printing data creation processing in the computer 50. Each processing operation illustrated in FIG. 4 is executed by the CPU 81 included in the computer 50.

First, the CPU 81 causes the image acquisition section 54 to acquire image data output from the application program 51 (step S10). In the acquisition, the CPU 81 acquires the image data in the same order as the image data of the printing request data OD. In the example of FIG. 3, the CPU 81 acquires the image data A, the image data B, and the image data C in this order. Each piece of the image data represents an image to be printed on the roll paper S and is expressed with tone values of R, G, and B.

Then, the CPU 81 causes the color converter 56 to perform color conversion processing on the image data acquired at step S10 (step S20). In the color conversion processing, each color component of R, G, and B specifying the image data is corrected to the color component of C, M, Y, and K usable in the printer 100 for each pixel. The processing is performed by using a color conversion table LUT that provides color components of C, M, Y, and K corresponding to hues expressed with a color system of R, G, and B.

Then, the CPU 81 causes the halftone processing section 57 to perform halftone processing on the image data subjected to the color conversion at step S20 by using a technique such as a dither method or an error diffusion method (step S30).

Then, the CPU 81 causes the output section 58 to sort the pieces of image data subjected to the halftone processing at step S30 in the order in which the pieces of image data are to be transmitted to the printer 100 and rasterize the pieces of sorted image data (step S40). Next, the CPU 81 causes the output section 58 to output the rasterized data to the printer 100 as printing data for front surface printing on the roll paper S (step S50). The processing of an image to be printed on the front surface of the roll paper S is described above from step S10 to step S50. In the processing of an image to be printed on the back surface of the roll paper S, a printing order position of the image and a color correction value used to perform color conversion processing in the same manner as in the original image of the reprint when the image is reprinted are output as printing data for back surface printing on the roll paper S.

Then, the CPU 81 determines whether the processing described above is complete for all of the images (step S60). If the processing is complete for all of the images (YES at step S60), the CPU 81 ends the printing data creation processing. On the other hand, if some images remain unprocessed (NO at step S60), the CPU 81 repeats the processing from step S10 onward.

Figure 5A:
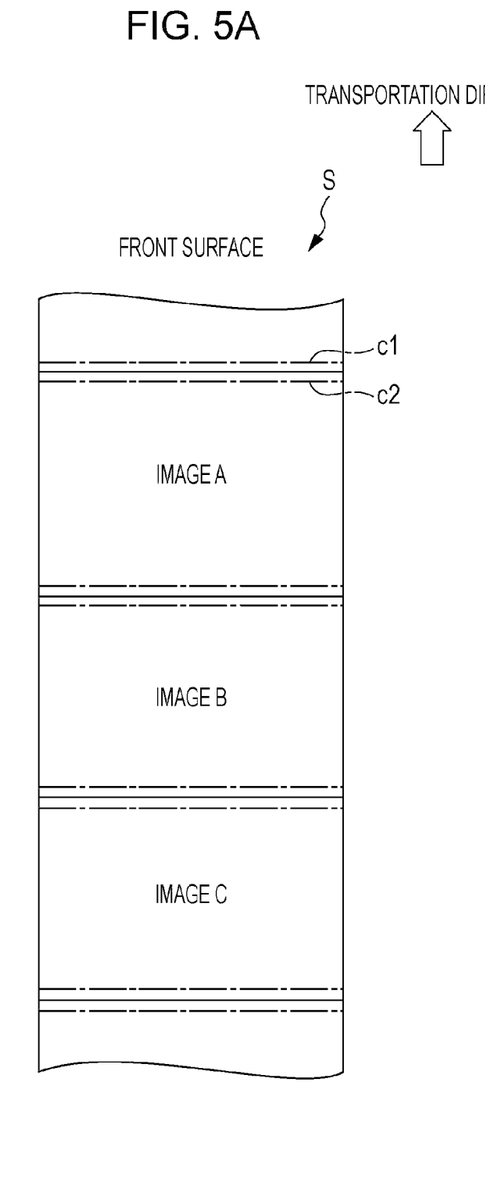
FIG. 5A illustrates images printed on a front surface of the roll paper.
Figure 5B:
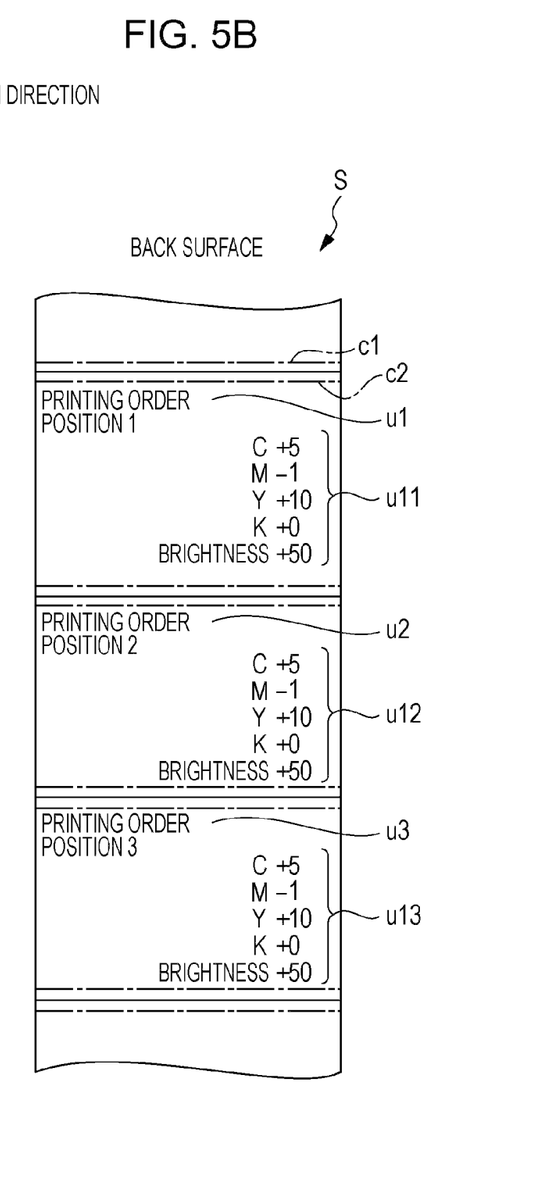
FIG. 5B illustrates images printed on a back surface of the roll paper.

FIGS. 5A and 5B are explanatory views illustrating examples of images printed on the roll paper S. FIG. 5A illustrates images printed on the front surface of the roll paper S. FIG. 5B illustrates images printed on the back surface of the roll paper S. FIGS. 5A and 5B illustrate the images printed by the printer 100 after the computer 50 receives the printing request data OD illustrated in FIG. 3 and the printing data creation processing illustrated in the flowchart of FIG. 4 is executed. In FIG. 5A, an image A, an image B, and an image C are printed on the front surface of the roll paper S in this order along the transportation direction so as to be adjacent to each other with no margins therebetween. The images have been subjected to the color conversion and halftone processing. In FIG. 5B, printing order positions u1 to u3 and color correction values u11 to u13 are printed on the back surface of the roll paper S so as to correspond to the respective images. The roll paper S is cut at the positions of cut lines c1 and c2, which are located near the borders of the respective images, after the printing is complete. As a result, the images A, B, and C are separated into individual image sheets.

Reprint Printing Setting Processing in the Client PC 310

The reprint printing setting processing in the client PC 310 when reprint printing is performed is described below.

Figure 6:
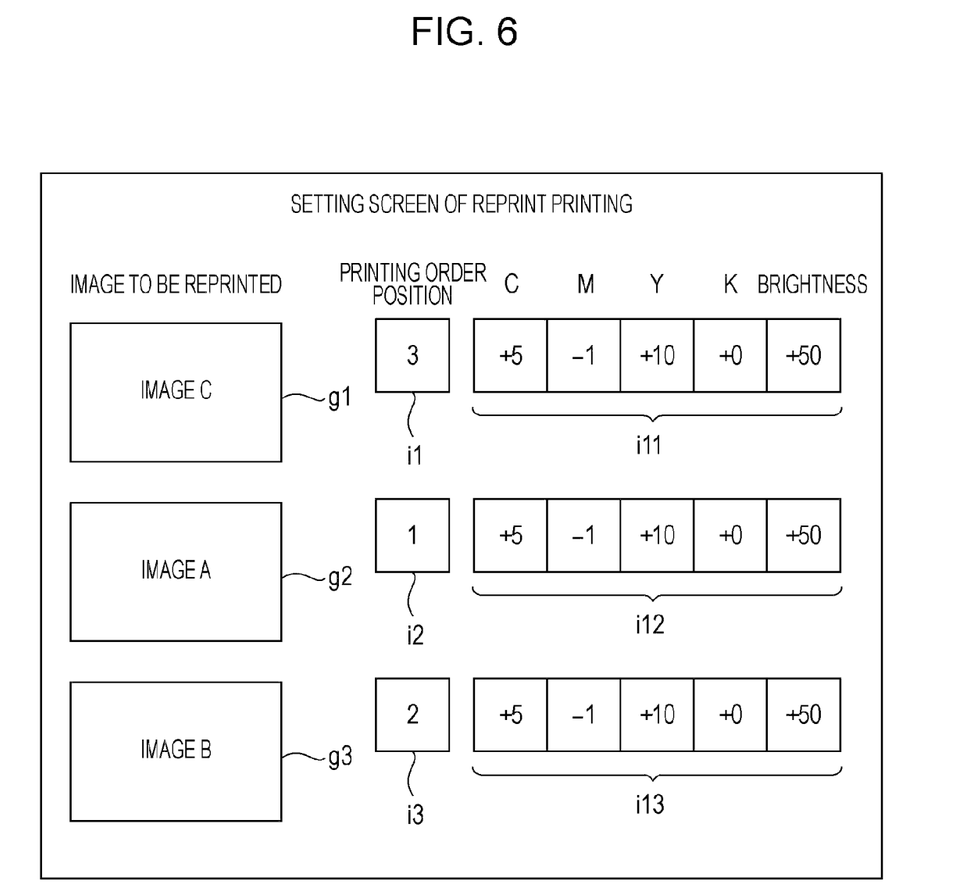
FIG. 6 is a schematic illustrating an example of a setting screen for reprint printing in the client PC.

A user inserts the memory card MC into the memory card slot 311 and operates the client PC 310 so as to designate an image to be reprinted, i.e., a target of reprint printing, (second image) from among the images having been printed on the roll paper S (first images). Operation procedures followed by the user are as follows. The client PC 310 displays the images stored in the memory card MC as a list of thumbnail images for the user, for example. The user selects an image to be reprinted from among the images. Thereafter, the user performs setting relating to printing of the image to be reprinted.

FIG. 6 is a schematic illustrating an example of a setting screen of reprint printing in the client PC 310. On areas g1 to g3 illustrated in FIG. 6, thumbnail images selected by the user as the images to be reprinted are displayed, for example. In FIG. 6, the images are displayed in the order in which they were selected by the user. That is, the user selects the images to be reprinted in the order of the image C, the image A, and the image B. In FIG. 6, columns i1 to i3 and i11 to i13 are input columns for the user. The user inputs the printing order in which the images to be reprinted were printed on the roll paper S into the columns i1 to i3. The user inputs the color correction values used when the images to be reprinted were printed on the roll paper S to the columns i11 to i13. Specifically, the user refers to the printing order positions u1 to u3 and the color correction values u11 to u13 of the respective images printed on the back surface of the roll paper S as illustrated in FIG. 5B and inputs them to the columns i1 to i3 and i11 to i13. For example, for the image C of FIG. 6, the printing order position "3", which is the printing order position of the image C as illustrated in FIG. 5B, is input to the column i1 and the color correction value C "+5", M "−1", Y "+10", K "+0", and brightness "+50", which are illustrated in FIG. 5B, are input to the column i11. The user makes a printing request to the computer 50 after the reprint printing setting is complete.

Figure 7:
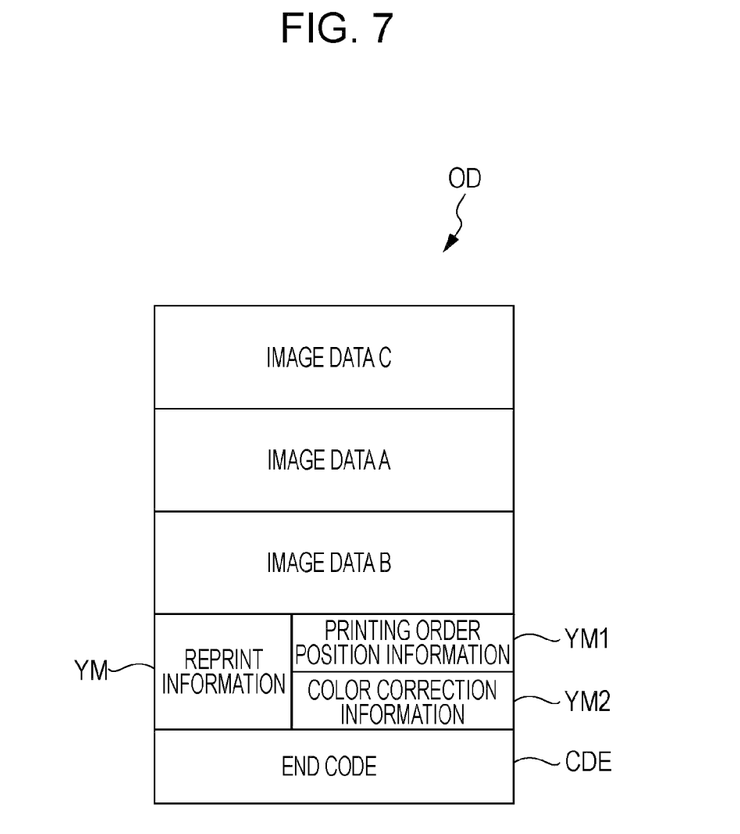
FIG. 7 is an explanatory view illustrating an example of the printing request data transmitted from the client PC when the printing request for reprint printing is made.

FIG. 7 is an explanatory view illustrating an example of the printing request data OD transmitted from the client PC 310 when the printing request for reprint printing is made. As illustrated in FIG. 7, the client PC 310 transmits the printing request data OD including the image data C, the image data A, and the image data B in this order to the computer 50. The order of the data of the image C, the image A, and the image B is the same as the order in which the user selected the images to be reprinted. The printing request data OD includes printing order information YM1 and color correction information YM2 as reprint information YM. The printing order information YM1 indicates the printing order of the images set by the user through the client PC 310 (the printing orders u1 to u3 illustrated in FIG. 5B). The color correction information YM2 indicates the color correction value of each of the images set by the user through the client PC 310 (the color correction values u11 to u13 illustrated in FIG. 5B). The printing request data OD includes at the end thereof the end code CDE indicating the end of the data.

Reprint Printing Data Creation Processing

Figure 8:
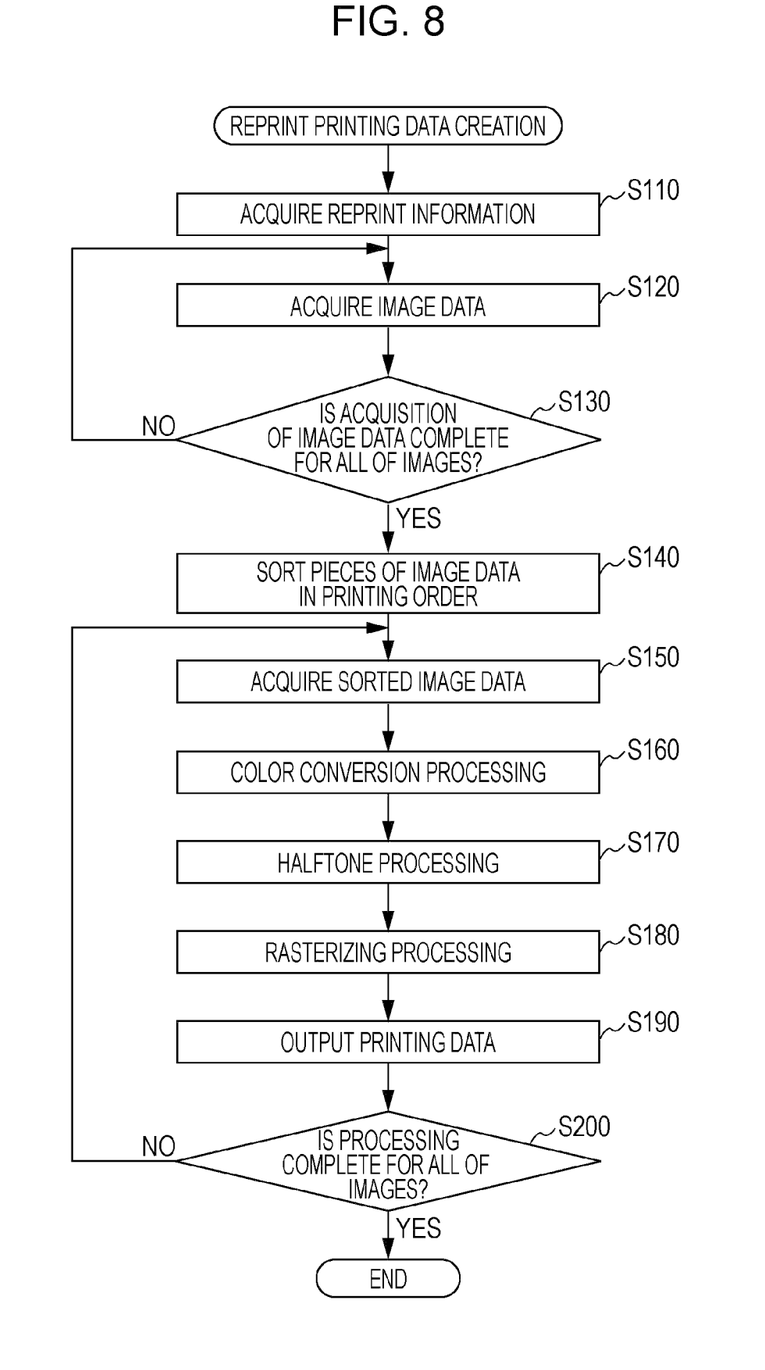
FIG. 8 is a flowchart illustrating printing data creation processing when reprint printing is performed.

The printing data creation processing performed when reprint printing is performed is described below. FIG. 8 is a flowchart illustrating the printing data creation processing in the computer 50 performed when reprint printing is performed. Each processing operation illustrated in FIG. 8 is executed by the CPU 81 included in the computer 50.

First, the CPU 81 causes the reprint information acquisition section 55 to acquire the reprint information YM output from the application program 51 (step S110). The reprint information YM is included in the printing request data OD received by the application program 51 from the client PC 310 as described above.

Then, the CPU 81 causes the image acquisition section 54 to acquire image data output from the application program 51 (step S120). In the acquisition, the CPU 81 acquires the image data in the same order as that of the image data of the printing request data OD. In the example of FIG. 7, the CPU 81 acquires the image data C, the image data A, and the image data B in this order. Then, the CPU 81 determines whether the acquisition of image data is complete for all of the images (step S130). If the acquisition of image data is complete for all of the images (YES at step S130), the CPU 81 proceeds to the succeeding step S140. On the other hand, if some images remain unprocessed (NO at step S130), the CPU 81 repeats the processing until the image data of all of the images is acquired.

At step S140, the CPU 81 sorts the pieces of image data acquired at step S120 in ascending order of printing order on the basis of the printing order information YM1 of the reprint information YM acquired at step S110. In the example of FIG. 7, the acquired pieces of image data in the order of the image data C, the image data A, and the image data B are sorted in the order of the image data A, the image data B, and the image data C on the basis of the printing order information YM1 of FIG. 7.

Then, the CPU 81 causes the image acquisition section 54 to acquire the pieces of image data sorted at step S140 piece by piece (step S150). The CPU 81 acquires the image data in the order of the image data A, the image data B, and the image data C.

Then, the CPU 81 causes the color converter 56 to perform color conversion processing on the image data acquired at step S150 (step S160). In the processing, the color components of R, G, and B are corrected to the color components of C, M, Y, and K usable in the printer 100 for each pixel on the basis of the color conversion table LUT and the color correction information YM2 of the reprint information YM acquired at step S110.

Then, the CPU 81 causes the halftone processing section 57 to perform halftone processing on the image data subjected to the color conversion processing at step S160 by using a dither method or an error diffusion method (step S170).

Then, the CPU 81 causes the output section 58 to sort the pieces of the image data subjected to the halftone processing at step S170 in the order in which the pieces of image data are to be transmitted to the printer 100 and rasterize the sorted image data (step S180). Then, the CPU 81 causes the output section 58 to output the rasterized printing data to the printer 100 (step S190).

Then, the CPU 81 determines whether the processing described above is complete for all of the pieces of sorted image data (step S200). If the processing is complete for all pieces of sorted image data (YES at step S200), the CPU 81 ends the printing data creation processing. On the other hand, if some image data remains unprocessed (NO at step S200), the CPU 81 repeats the processing from step S150 onward.

The operation of acquiring the reprint information and the reprint information acquisition function correspond to step S110 of FIG. 8. The operation of printing the second image and the output function correspond to step S140 to step S200 of FIG. 8.

As described above, in the embodiment, the reprint information YM is acquired from the client PC 310 and pieces of image data of images to be reprinted are sorted in the printing order in which the images were printed on the roll paper S on the basis of the printing order information YM1 of the reprint information YM. The pieces of sorted image data are transmitted to the printer 100 in the sorted order and the images to be reprinted are printed on the roll paper S. Accordingly, the images to be reprinted are printed on the roll paper S in the same printing order as the printing order in which the original images of the reprints were printed on the roll paper S. As a result, reprint image sheets that are cut after being printed on the roll paper S can be easily organized because the printing order positions thereof are clear. In addition, it is easy to confirm whether all of the reprint image sheets have been satisfactorily printed.

When the images are continuously printed as illustrated in the example of the printed images of FIG. 5A, the halftone processing is continuously performed on the images. In such a case, a preceding printed image may influence the succeeding image to be printed among adjacent images depending on the technique used for the halftone processing. To address the problem, the halftone processing is performed after the images to be reprinted are sorted in the order in which the original images of the reprints were printed on the roll paper S. As a result, the images to be reprinted are likely to receive the same effects from the halftone processing as the original images of the reprints printed on the roll paper S. Accordingly, the images to be reprinted are printed as the images faithfully restoring the original images of the reprints having been printed on the roll paper S, enabling the creation of a perception of difference between the reprinted image and the original image of the reprint to be suppressed.

Modification Example 1

In the above-described embodiment, a user manually inputs the printing order position and the color correction value of the image to be reprinted through the setting screen of the reprint printing illustrated in FIG. 6. For example, a two-dimensional code or a bar code representing the information of the printing order position and the color correction value may be printed on the back surface corresponding to the position of each image on the roll paper S and the client PC 310 may read the information without the manual input of such information by the user through the setting screen.

Modification Example 2

In the above-described embodiment, the elongated roll paper S, which is wound in a roll shape, is used as the printing medium. The printing medium is not limited to the roll paper. For example, another type of elongated paper may be used. The printing medium is not limited to paper. A printing medium made of a film is also applicable.

What is claimed is:

1. A printing controller, comprising:
   an image acquisition section that receives designation of an image to be reprinted;
   a reprint information acquisition section that receives a printing order position of the image; and
   an output section that causes a printer to print the image on the basis of the printing order, wherein the printing order of the image indicates a previously printed position of the image with respect to a previously printed position of at least one other image,
   wherein the printing order position is printed on a back surface of the image having been printed.

2. The printing controller according to claim 1, further comprising a processor that performs image correction on the image to be reprinted on the basis of the printing order and image correction information that are received by the reprint information acquisition section.

3. The printing controller according to claim 2, wherein the printer prints an image on roll paper, and the processor performs halftone processing on an image sorted on the basis of the printing order.

4. The printing controller according to claim 1, wherein prior to the image acquisition section receiving designation of the image to be reprinted and prior to the reprint information acquisition section receiving the printing order, the output section causes the printer to print the image.

5. A printing controller, comprising:
   an image acquisition section that receives designation of a first image to be reprinted and one or more additional images to be reprinted;
   a reprint information acquisition section that receives a printing order position of the first image and of each of the one or more additional images; and
   an output section that causes a printer to print the first image and the one or more additional images on the basis of the printing order of the one or more additional images and on the basis of the printing order of the first image, wherein the printing order of the first image indicates a previously printed position of the first image with respect to the one or more additional images that were previously printed, and the printing order of the one or more additional images indicates previously printed positions of the one or more additional images with respect to the first image and to one another,
   wherein the printing order position is printed on a back surface of the image having been printed.

* * * * *